United States Patent [19]
Somers

[11] Patent Number: 5,144,502
[45] Date of Patent: Sep. 1, 1992

[54] CASSETTE RECORDER MAGNETIC READ HEAD ARRANGEMENT FOR AUTOREVERSE

[75] Inventor: Gerardus H. J. Somers, Eindhoven, Netherlands

[73] Assignee: U.S. Philips Corporation, New York, N.Y.

[21] Appl. No.: 621,117

[22] Filed: Nov. 30, 1990

[30] Foreign Application Priority Data

May 30, 1990 [NL] Netherlands ............... 9001231

[51] Int. Cl.$^5$ .................. G11B 5/09; G11B 15/14
[52] U.S. Cl. ........................... 360/63; 360/67
[58] Field of Search ............... 368/61, 63, 67, 113

[56] References Cited

U.S. PATENT DOCUMENTS

| | | | |
|---|---|---|---|
| 4,044,387 | 8/1977 | Watkins | 360/63 |
| 4,616,272 | 10/1986 | Moriyama | 360/63 |
| 4,685,005 | 8/1987 | Fields Jr. | 360/63 |

Primary Examiner—Vincent P. Canney
Attorney, Agent, or Firm—John C. Fox

[57] ABSTRACT

A read head arrangement comprising n first read heads ($h_{a.1}, \ldots, h_{a.n}$) and n second read heads ($h_{b.1}, \ldots, h_{b.n}$) of the magnetoresistance type, n transistors ($Tr_1, \ldots, Tr_n$) and switching means (S), where n is an integer greater than two. The first main electrode (collector) of a transistor ($Tr_i$) is coupled to an i-th output ($U_i$) of the arrangement. The second main electrode (emitter) of the transistor ($Tr_i$) is coupled to a first terminal ($t_1$) of a first read head ($h_{a.i}$) and a second read head ($h_{b.i}$). The second terminal ($t_2$) of the first read head ($h_{a.1}$) is coupled to a first terminal (a) of the switching means (S). The second terminal ($t_2$) of the second read head ($h_{b.1}$) is coupled to a second terminal (b) of the switching means (S), of which a third terminal (c) is coupled to a point of constant potential (earth), while i ranges from 1 to n.

6 Claims, 1 Drawing Sheet

CASSETTE RECORDER MAGNETIC READ HEAD ARRANGEMENT FOR AUTOREVERSE

FIELD OF THE INVENTION

The invention relates to a read head arrangement comprising a plurality of n first read heads and a plurality of n second read heads, all of the magnetoresistance type, the n first read heads being arranged for reading a signal, for example, a digital audio signal, from n first tracks running parallel to each other and in the longitudinal direction of a magnetic record carrier on this record carrier, the n second read heads being arranged for reading a signal, for example, a digital audio signal, from n tracks running parallel to each other and in longitudinal direction of the record carrier on this record carrier, the n second tracks running parallel to the n first tracks on the record carrier, the read head arrangement comprising output terminals for supplying to these output terminals the signals read from the n tracks by the n first and second read heads. The invention particularly relates to the application of such a type of read head arrangement in autoreverse cassette recorders.

BACKGROUND OF THE INVENTION

In autoreverse cassette recorders of this type, when side A of a cassette is reproduced, the direction of transport of the tape is reversed at the moment when the end of the tape is reached so as to enable reproduction of side B of the cassette. In some autoreverse cassette recorders the read heads reading the signals from the tracks of side A are then moved at the same time so that they are positioned above the tracks of side B and are capable of reading the signals from the tracks of side B.

In other autoreverse cassette recorders the read head arrangement has a stationary position and comprises as many heads as there are tracks on the A and B sides of the magnetic record carrier. During the interval in which the direction of transport is changed, a change is also made from reading side A, by means of the n first read heads, to reading side B by means of n second read heads. The read head arrangement is intended to be used in such an autoreverse cassette recorder.

For reading a signal, for example a digital signal, from n adjacent tracks on the record carrier, read heads of the magnetoresistance type usually manufactured in thin-film technology are used, especially where n is much greater than 2.

Thin-film heads of this type are realised on a chip. It is customary nowadays with multi-track thin-film heads to lead the electrical outputs of the heads individually from the chip to the exterior so that then at least $2n+1$ outputs on the chip are necessary.

SUMMARY OF THE INVENTION

It is an object of the invention to propose a read head arrangement in which the read heads select in a special manner so that fewer outputs on the chip may suffice.

For this purpose, the read head arrangement is characterised in that n is greater than 2, in that the read head arrangement has n output terminals and n amplifier stages, each amplifier stage having an input with a low-dynamic input resistance and an output, in that the output of the i-th amplifier stage is coupled to the i-th output terminal, the input of the i-th amplifier stage being coupled to a first terminal of both the i-th first read head and the i-th second read head, a second terminal of the i-th first read head being coupled to a first terminal of a switching means, the second terminal of the i-th second read head being coupled to a second terminal of this switching means, a third terminal of the switching means being coupled to a point of constant potential, and in that the switching means is arranged for connecting the first or the second terminal to the third terminal, and in that i ranges from 1 to n. Preferably, the second terminals of the n first read heads are coupled each to the first terminal of the switching means and the second terminals of the n second read heads are coupled each to the second terminal of the switching means. The invention is based on the understanding that in the prior-art read head arrangement it may sometimes be impossible to realise the $2n+1$ outputs. This in view of the limited amount of space available on the chip for the connections.

According to the invention use is made of the feature that a thin-film read head of the magnetoresistance type is capable of reading a signal from a track only if the read head is conveying current. The selection may thus be realised by allowing the appropriate read heads to conduct current. According to the invention first terminals of corresponding read heads, that is to say, the i-th first read head and the i-th second read head, are electrically interconnected on the chip and connected to the input of the associated amplifier stage. Since the inputs of the amplifier stages have a low-dynamic input resistance, a low a.c. current resistance is obtained at the common terminal of the read heads to be selected, so that crosstalk between the current-carrying read heads as a result of the electrical connection by way of the read heads not carrying current can be minimized.

The n amplifier stages are each in the form of a transistor having a base earthed for a.c. current, a first main electrode of the i-th transistor constituting the output of the i-th amplifier stage and a second main electrode of the i-th transistor constituting the input of the i-th amplifier stage. With amplifier stages in the form of a transistor one may think of an amplifier stage consisting of only a single transistor, but also amplifier stages consisting of more than one transistor, for example, a Darlington pair.

In this respect it should be observed that the selection of read heads of the magnetoresistance type is known from U.S. Pat. No. 4,020,364.

BRIEF DESCRIPTION OF THE DRAWING(S)

The invention will be further explained with reference to an exemplary embodiment, in which FIG. 1 shows an exemplary embodiment of the read head arrangement, and FIG. 2 shows the magnetic record carrier having the 2n tracks.

DESCRIPTION OF EMBODIMENTS

Figure 1:
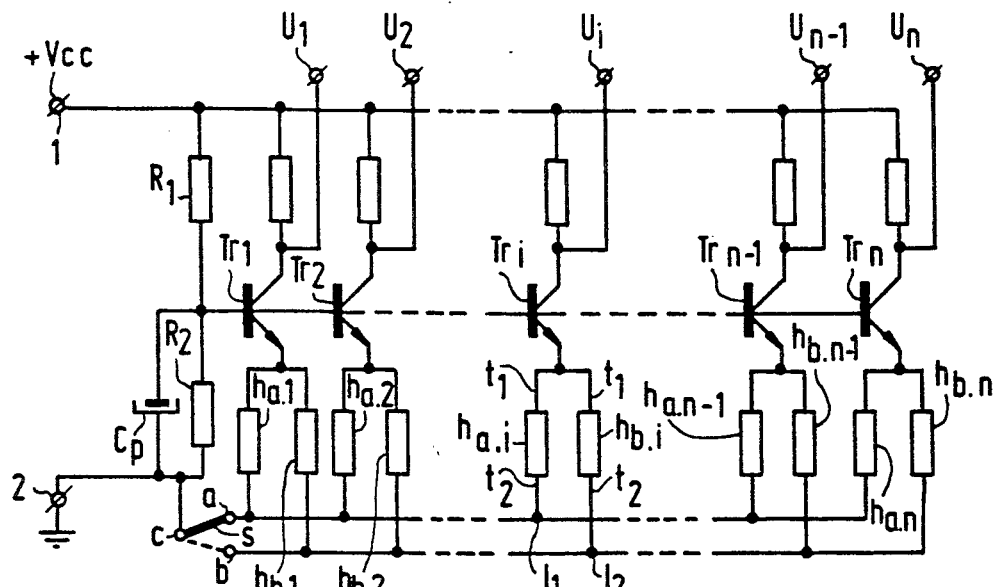
Figure 2:
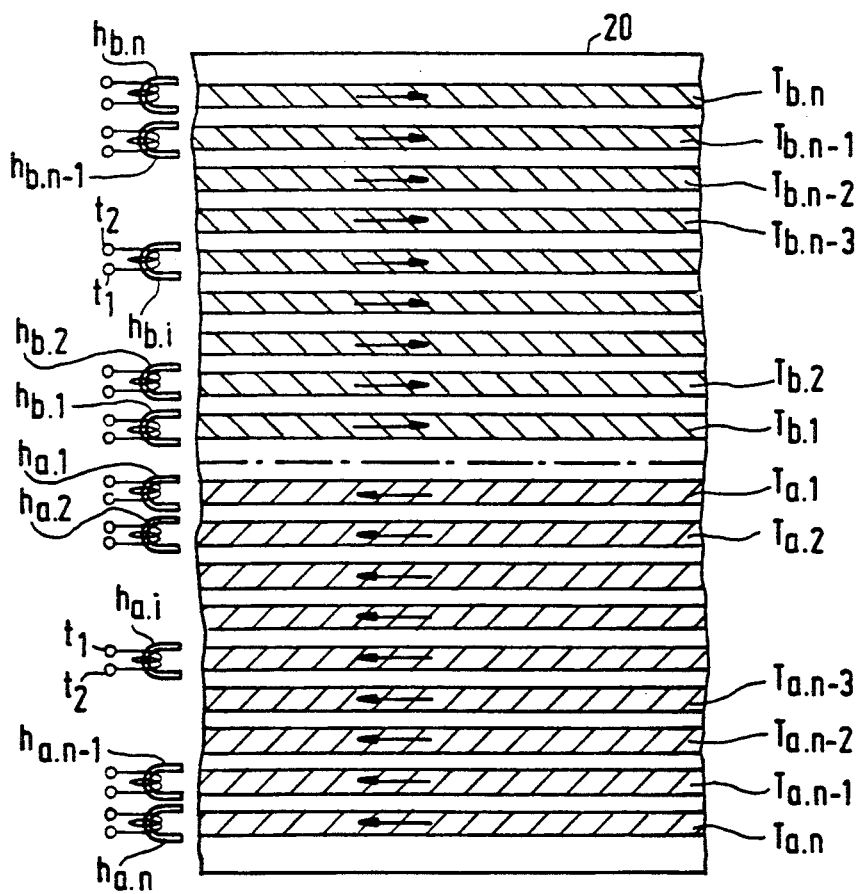

FIG. 1 shows the read head arrangement comprising a plurality of n first read heads $h_{a.1}$, $h_{a.2}$, $h_{a.3}$, ..., $h_{a.n-1}$, $h_{a.n}$ and a plurality of n second read heads $h_{b.1}$, $h_{b.2}$, $h_{b.3}$, ..., $h_{b.n-1}$, $h_{b.n}$, all of the magnetoresistance type. The read heads $h_{a.1}$ to $h_{a.n}$ read out signals contained in the n tracks $T_{a.1}$ to $T_{a.n}$ on the A side of a record carrier 20. This is represented in FIG. 2. The direction of transport of the record carrier 20 when the tracks $T_{a.1}$ to $T_{a.n}$ are read out is denoted in these tracks by means of the arrows.

The read heads $h_{b.1}$ to $h_{b.n}$ read out signals contained in n tracks $T_{b.1}$ to $T_{b.n}$ respectively, on the B side of the record carrier 20, cf. FIG. 2. n is an integer greater than two. In FIG. 1 only the electrical equivalent of the MR heads, that is to say the resistors, is shown.

The arrangement further includes n amplifier stages each having an input with a low-dynamic input resistance and an output. The exemplary embodiment of FIG. 1 shows amplifier stages in the form of a transistor $T_{r1}$ to $T_{rn}$ respectively, having a base earthed or a.c. current. The emitters of the transistors $T_{r1}$ to $T_{rn}$ form the inputs of the amplifier stages and the collectors form the outputs of the amplifier stages.

The amplifier stages may consist of a single transistor. However, it is altenatively possible to manufacture the amplifier stages of more than one transistor. Darlington pairs may be considered for an amplifier stage. The transistors may be bipolar transistors, but also different types of transistors such as MOS transistors are possible.

FIG. 1 shows an exemplary embodiment comprising npn transistors. The first main electrodes (collectors) of the transistors are coupled each to a first point 1 of constant potential ($V_{cc}$) by means of an impedance in the form of a resistor. Furthermore, the first main electrode (collector) of the i-th transistor $Tr_i$ is coupled to an i-th output terminal $u_i$ of n output terminals $u_1$ to $u_n$.

The first terminal $t_1$ of the i-th first read head $h_{a.i}$ is coupled to the first terminal $t_1$ of the i-th second read head $h_{b.i}$. Both first connecting points are additionally coupled to the second main electrode (emitter) of the transistor $Tr_i$. The second connecting point $t_2$ of the first read head $h_{a.i}$ is coupled to a first terminal a of a switching means, in the form of a single switch S. The second connecting point of the second read head $h_{b.1}$ is coupled to a second terminal b of the switching means S. This holds for any value of i, where i ranges from 1 to n. A third terminal c of the switching means S is coupled to a second point 2 of constant potential (earth). The control electrodes (bases) of the transistors are mutually coupled. The voltages on these control electrodes are produced by the voltage divider constituted by the resistors $R_1$ and $R_2$ and the capacitance $C_p$, inserted between the first and second points of constant potential. With the switching means S in the state in which terminal c is connected to terminal a, the return line $l_1$ is allowed to convey current. In this fashion the read heads $h_{a.1}$ to $h_{a.n}$ are selected and the signals read by these read heads from the tracks $T_{a.1}$ to $T_{a.n}$ can be presented at the output terminals $u_1$ to $u_n$ respectively, by means of the transistors $Tr_1$ to $Tr_n$. With the switching means S in the state in which terminal c is connected to terminal b, the return line $l_2$ is allowed to convey current. Through this line the read heads $h_{b.1}$ to $h_{b.n}$ are selected and the signals read from the tracks $T_{b.1}$ to $T_{b.n}$ by these read heads can be presented at the output terminals $u_1$ to $u_n$ by means of the transistors $Tr_1$ to $Tr_n$.

The reading of a signal by a head, for example, the head $a.1$, means that the signals recorded in the tracks realise a resistance variation in the head resistance. Due to the power flowing through the head this might lead to voltage variations over the head, and thus to voltage variations on the emitter of the transistor $Tr_1$. By means of the non-activated heads $h_{b.1}$ and $h_{b.2}$ and the return line $l_2$ these voltage variations might cause cross-talk on the emitter of the transistor $Tr_2$, which is undesirable.

Because the input of all amplifier stages for a.c. current has a low input impedance, it is avoided (in the best way possible) that voltage variations occur across the head $h_{a.1}$, so that (practically) no cross-talk to another input can take place.

In the present example the low-dynamic input impedance is realised by means of a transistor having a base earthed for a.c. current. Self-evidently, the switch S can be realised electronically.

The read head arrangment as discussed hereinbefore can be applied to an arrangment for reading a digital signal from n tracks on a record carrier, as is described in Dutch Patent Applications No. 90.00.039 filed Jan. 8, 1990, to which U.S. Patent application Ser. No. 598,287 filed Oct. 16, 1990 corresponds or 90.00.635 filed Mar. 20, 1990, to which U.S. Patent application Ser. No. 669,136 filed Mar. 20, 1991 corresponds or 90.01.038 filed May 1, 1990 to which U.S. Patent application Ser. No. 686,329 filed Apr. 16, 1991 corresponds which are assumed to be incorporated in this application where necessary.

It should be observed in this respect that the invention is not restricted solely to the exemplary embodiment shown. The various modifications of the described exemplary embodiment are conceivable without leaving the scope of the invention as defined in the claims.

I claim:

1. Read head arrangement comprising a plurality of n first read heads and a plurality of n second read heads, all of the magnetoresistance type, the n first read heads being arranged for reading a signal, for example, a digital audio signal, from n first tracks running parallel to each other and in the longitudinal direction of a magnetic record carrier on this record carrier, the n second read heads being arranged for reading a signal, for example, a digital audio signal, from n tracks running parallel to each other and in longitudinal direction of the record carrier on this record carrier, the n second tracks running to the n first tracks on the record carrier, the read head arrangement comprising output terminals for supplying to these output terminals the signals read from the n tracks by the n first and second read heads, characterised in that n is greater than 2, in that the read head arrangement has n output terminals and n amplifier stages, each amplifier stage having an input with a low-dynamic input resistance and an output, in that the output of the i-th amplifier stage is coupled to the i-th output terminal, the input of the i-th amplifier stage being coupled to a first terminal of both the i-th first read head and the i-th second read head, a second terminal of the i-th first read head being coupled to a first terminal of a switching means, the second terminal of the i-th second read head being coupled to a second terminal of this switching means, a third terminal of the switching means being coupled to a point of constant potential, and in that the switching means is arranged for connecting the first or the second terminal to the third terminal, and in that i ranges from 1 to n.

2. Read head arrangement as claimed in claim 1, characterised in that each of the second terminals of the n first read heads are coupled to the first terminal of the switching means and in that each of the second terminals of the n second read heads are coupled to the second terminal of the switching means.

3. Read head arrangement as claimed in claim 2, characterised in that each of the n amplifier stages are in the form of a transistor having a base which is earthed for a.c current, a first main electrode of the i-th transistor constituting the output of the i-th amplifier stage and a second main electrode of the i-th transistor constituting the input of the i-th amplifier stage.

4. Read head arrangement as claimed in claim 3, characterised in that the first main electrode of the transistor is the collector and the second main electrode is the emitter.

5. Read head arrangement as claimed in claim 1, characterized in that the n amplifier stages are each in the form of a transistor having a base which is earthed for a.c. current, a first main electrode of the i-th transistor constituting the output of the i-th amplifier stage and a second main electrode of the i-th transistor constituting the input of the i-th amplifier stage.

6. Read head arrangement as claimed in claim 5, characterized in that the first main electrode of the transistor is the collector and the second main electrode is the emitter.

* * * * *